Aug. 9, 1927.

W. J. SMALL 1,638,370

CUSHION TIRE

Filed June 1. 1925

Inventor
William J. Small

By Bacondshaw
Attorneys

Aug. 9, 1927.
W. J. SMALL
1,638,370
CUSHION TIRE
Filed June 1. 1925
2 Sheets-Sheet 2
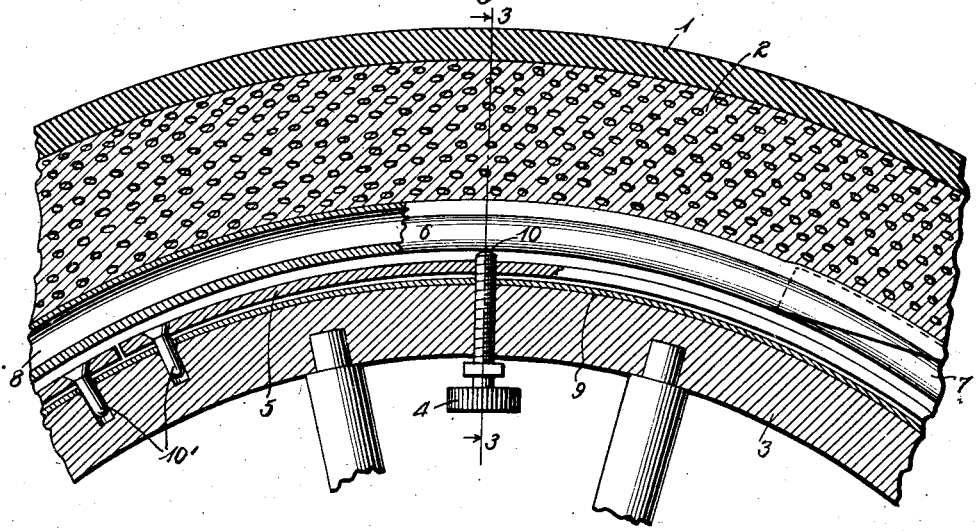
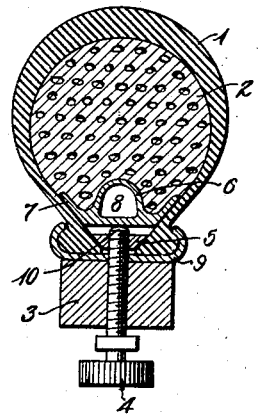
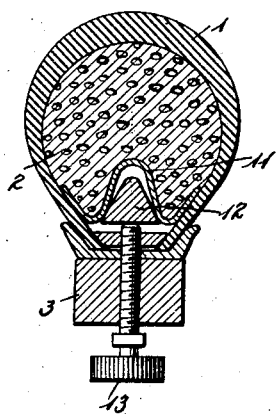
Inventor
William J. Small Patented Aug. 9, 1927.

1,638,370

UNITED STATES PATENT OFFICE.

WILLIAM J. SMALL, OF PORT TOWNSEND, WASHINGTON, ASSIGNOR OF ONE-HALF TO LUCIEN E. BECKER, OF PORTLAND, OREGON.

CUSHION TIRE.

Application filed June 1, 1925. Serial No. 34,090.

This invention relates to cushion tires.

The primary object of the invention is to provide means for securely clamping the tire casing to the rim, and, by the same operation, to expand the sponge rubber core to obtain the desired resiliency thereof.

More specifically the invention comprehends the use of a ring for expanding the core and a secondary inner ring for clamping the casing to the rim by a single operation.

Other and more detailed objects of the invention will be apparent from a reading of the following specification in conjunction with the drawing attached hereto and forming a part hereof in which,—

Fig. 2 is a fragmentary longitudinal sectional view of the tire disclosing the operative screw and the retaining lugs.

Fig. 3 is a cross-sectional view taken on line 3—3 of Fig. 2.

Fig. 4 is a cross-sectional view showing a modification of the invention.

Figure 1:
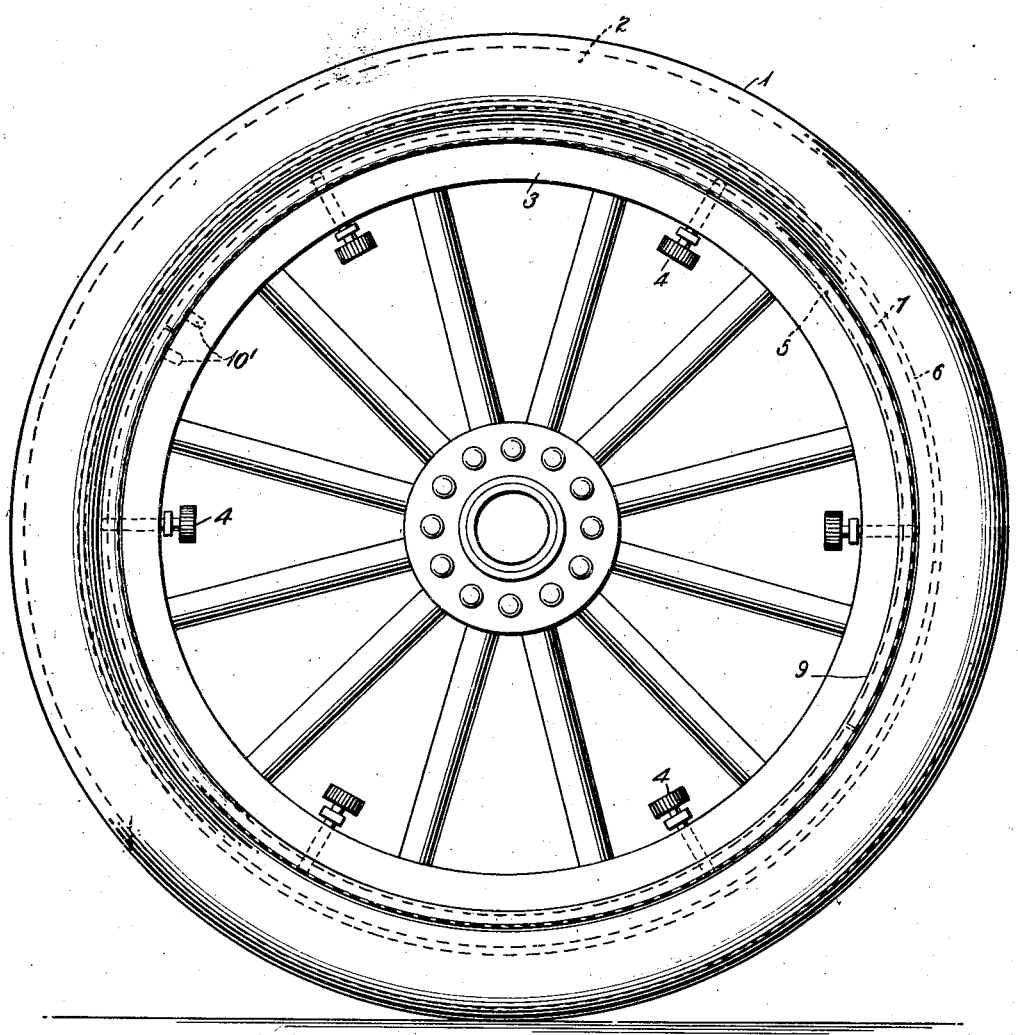
Figure 1 is an elevation of the felloe, rim, tire and the operating mechanism.

Referring now more specifically to the drawings, 1 indicates the tire casing which is of conventional construction, 2 is the core which is preferably made of sponge rubber and is employed as a substitute for the ordinary inner tube, 3 is the felloe of conventional form. The invention comprehends the employment of a multiplicity of operating screws spaced circumferentially around the felloe and which may be attached by simply drilling holes through the felloe and rim at the desired points. 5 is an inner ring which I term the "tire engaging ring". This ring is of wedge shape formation in order that it may engage the inner sides of the tire without mutilation of the tire. The ring 5 is split transversely to permit expansion and contraction thereof. This ring is screw-threaded at spaced circumferential points for receiving the screws 4.

There is also provided an outer core expanding ring 6 which is provided with inclined flanges 7, which conform substantially to the curvature of the tire casing. This ring is hollowed out as at 8 for the purpose of preventing undue weight thereof. This ring, of course, is split transversely.

It will be obvious that upon a manipulation of the operating screw 4 tire engaging ring 5 is caused to move inwardly with respect to the axis of the wheel and thereby engage the tire at the body portions thereof to securely press into engagement with the rim 9. By this operation of the screw, the same is caused to move outwardly with respect to the axis of the wheel so that the end 10 thereof, simultaneously presses against the inner side of the core expanding ring 6, which is caused to expand circumferentially and thus compact the sponge rubber core to the desired extent in order that a given pressure may be obtained.

In applying my device to a tire it is of course essential that the openings of the ring 5 shall be in alignment with the operating screws 4. To insure the alignment of these parts I provide lugs 10' on the ring 5, and extending at substantial right angles thereto and engaging holes in the rim. When the lugs are thus secured a lateral employment of the ring 3 is prevented and a registration of the operating screws with the openings in the ring insured.

The modified form of my invention disclosed in Figure 4 includes substantially the same operating instrumentalities as the above described form of my invention, but in addition it includes the inverted W-shaped element 11 which is made of light spring material. This element constitutes a means for expanding the core outwardly or circumferentially and transversely. By reason of the peculiar shape of this element 11, and the association of the wedge-shaped element 12, which is caused to engage it when the operating screw 13 is manipulated, a balloon effect to tires may be obtained.

It will be apparent from the reading of the foregoing that the invention is of exceedingly simple nature and it can be readily attached to conventional automobile wheels by simply boring a few holes through the felloe and rim.

What I claim is:

In a resilient tire, the combination with a tire casing, of an elastic core therefor, a rim receiving the extremities of said tire casing, means for mechanically applying pressure to the core to vary the resiliency thereof, said means comprising a transversely split circumferentially expanding ring of substantially W-shaped formation with its extremities fitting between the core material and said casing, the central portion of said ring being of tapering formation, a wedge-shaped ring element fitting within the confines of said central portion of the expanding ring, adjustable screws extending through said felly for engaging the wedge-shaped element and causing an outward deflection of the core expanding member, a tire engaging ring mounted on said adjusting devices and adapted to simultaneously urge the extremities of the tire casing into engagement with the rim.

In testimony whereof I affix my signature.

WILLIAM J. SMALL.